United States Patent
Bratzdrum et al.

(10) Patent No.: US 6,704,685 B2
(45) Date of Patent: Mar. 9, 2004

(54) METHOD AND DEVICE FOR DETERMINING THE SIGNAL RUNNING TIME BETWEEN A POSITION MEASURING SYSTEM AND A PROCESSING UNIT

(75) Inventors: Erwin Bratzdrum, Hellabruck (DE); Robert Wastlhuber, Garching/Alz (DE)

(73) Assignee: Dr. Johannes Heindenheim GmbH, Traunreut (DE)

( * ) Notice: Subject to any disclaimer, the term of this patent is extended or adjusted under 35 U.S.C. 154(b) by 0 days.

(21) Appl. No.: 10/325,501

(22) Filed: Dec. 20, 2002

(65) Prior Publication Data

US 2003/0135348 A1 Jul. 17, 2003

(30) Foreign Application Priority Data

Dec. 20, 2001 (DE) .......................... 101 62 735

(51) Int. Cl.[7] .................... G04F 10/00; G05B 19/042
(52) U.S. Cl. .................... 702/178; 702/150; 714/701
(58) Field of Search ................. 702/150, 178, 702/183; 370/498; 701/120, 220; 714/701, 799, 819; 360/32

(56) References Cited

U.S. PATENT DOCUMENTS 5,097,364 A * 3/1992 Goto et al. ................ 360/32

5,687,103 A * 11/1997 Hagl et al. ................. 702/150
2002/0015449 A1 2/2002 Wastluber et al. .......... 370/498

FOREIGN PATENT DOCUMENTS

DE 100 30 357 A1 1/2002

* cited by examiner

Primary Examiner—Kamini Shah
(74) Attorney, Agent, or Firm—Brinks Hofer Gilson & Lione

(57) ABSTRACT

A device for determining a signal running time between a position measuring system and a processing unit. The device includes first and second position signal generators that generate position signals regarding relative chronological position of a first running time measuring signal with respect to first and second data words. A first transmitter that transmits the first running time measuring signal and the first position signal to the position measuring system at the end of transmission of the first data word to the position measuring system. A second transmitter that transmits a second running time measuring signal and the second position signal to the processing unit after the end of transmission of the second data word. A timer that ascertains a length of time between transmission of the first running time measuring signal and reception of the second running time measuring signal by the processing unit and a signal running time generator that determines a signal running time from the length of time.

18 Claims, 2 Drawing Sheets

METHOD AND DEVICE FOR DETERMINING THE SIGNAL RUNNING TIME BETWEEN A POSITION MEASURING SYSTEM AND A PROCESSING UNIT Applicants claim, under 35 U.S.C. § 119, the benefit of priority of the filing date of Dec. 20, 2001 of a German patent application, copy attached, Serial Number 101 62 735.1, filed on the aforementioned date, the entire contents of which is incorporated herein by reference.

BACKGROUND OF THE INVENTION

1. Field of the Invention

The present invention relates to a method for determining the signal running time between a position measuring system and a processing unit which are connected with each other via a digital interface, wherein data words of defined length are transmitted between the position measuring system and the processing unit via the digital interface, and ascertaining of the signal running time between the position measuring system and the processing unit takes place. The present invention furthermore relates to a device for executing the method.

2. Discussion of Related Art

In the context of a data transmission between several position measuring systems and a downstream-arranged processing unit via a digital interface, certain problems result in particular in the case of long transmission paths. Therefore, not inconsiderable running times on the respective data line result in this case. The resultant delay times must be taken into account for the correct further processing of the various data by the processing unit. If now there are configurations of several position measuring systems which are connected with a common, downstream-connected processing unit, the task arises, prior to the actual measuring operation, to determine the respective signal running times as exactly as possible, so that they can be suitably taken into consideration afterwards.

OBJECT AND SUMMARY OF THE INVENTION

It is therefore an object of the present invention to disclose a method for as precise as possible a determination of the signal running time between a position measuring system and a processing unit which communicate with each other via a digital interface.

This object is attained by a method for determining a signal running time between a position measuring system and a processing unit, which are connected with each other. The method includes transmitting data words of defined length between a position measuring system and a processing unit and transmitting a first data word from the processing unit to the position measuring system. Transmitting a first incoming running time measuring signal from the processing unit to the position measuring system during the transmitting the first data word and determining a first position signal regarding a relative chronological position of said the running time measuring signal in relation to the first data word. Following an end of transmission of the first data word, transmitting the first running time measuring signal and the first position signal as binary data words to the position measuring system. Transmitting a second data word from the position measuring system to the processing unit and determining a second position signal regarding a chronological relative position of the first running time measuring signal with respect to said the data word. Following an end of transmission of the second data word, transmitting the second running time measuring signal and the second position signal as binary data words to the processing unit. Ascertaining a length of time between the transmitting of the first running time measuring signal and receipt of the second running time measuring signal by the processing unit and determining a signal running time for transmission of data between the position measuring system and the processing unit from the ascertained length of time.

The present object is furthermore attained by a device for determining a signal running time between a position measuring system and a processing unit, which are connected with each other. The device includes a first position signal generator that generates a first position signal regarding a relative chronological position of a first running time measuring signal with respect to a first data word, which are both transmitted from a processing unit to a position measuring system. A first transmitter that transmits the first running time measuring signal and the first position signal, each as a binary data word, to the position measuring system at the end of transmission of the first data word to the position measuring system. A second position signal generator that generates a second position signal regarding a relative chronological position of the first running time measuring signal with respect to a second data word, which is transmitted from the position measuring system to the processing unit to a position measuring system. A second transmitter that transmits a second running time measuring signal and the second position signal, each as a binary data word, to the processing unit after the end of transmission of the second data word. A timer that ascertains a length of time between transmission of the first running time measuring signal and reception of the second running time measuring signal by the processing unit and a signal running time generator that determines a signal running time from the length of time.

In accordance with the present invention, a principle as already described in German Patent Application 100 30 357.9, to whose disclosure specific reference is being made here, is employed in a changed form for the precise determination of the signal running time.

Analogous to the process in the mentioned document it is now possible in accordance with the present invention to transmit running time measuring signals with high chronological precision between the position measuring system and the processing unit. The end result is an exact determination of the signal running times between the position measuring system and the processing unit.

The signal running time determined in this way is subsequently suitably used or taken into consideration in the course of further processing of the transmitted data.

Further advantages as well as details of the present invention ensue from the following description of an exemplary embodiment by the attached drawings.

DETAILED DESCRIPTION OF THE PREFERRED EMBODIMENTS

Figure 1:
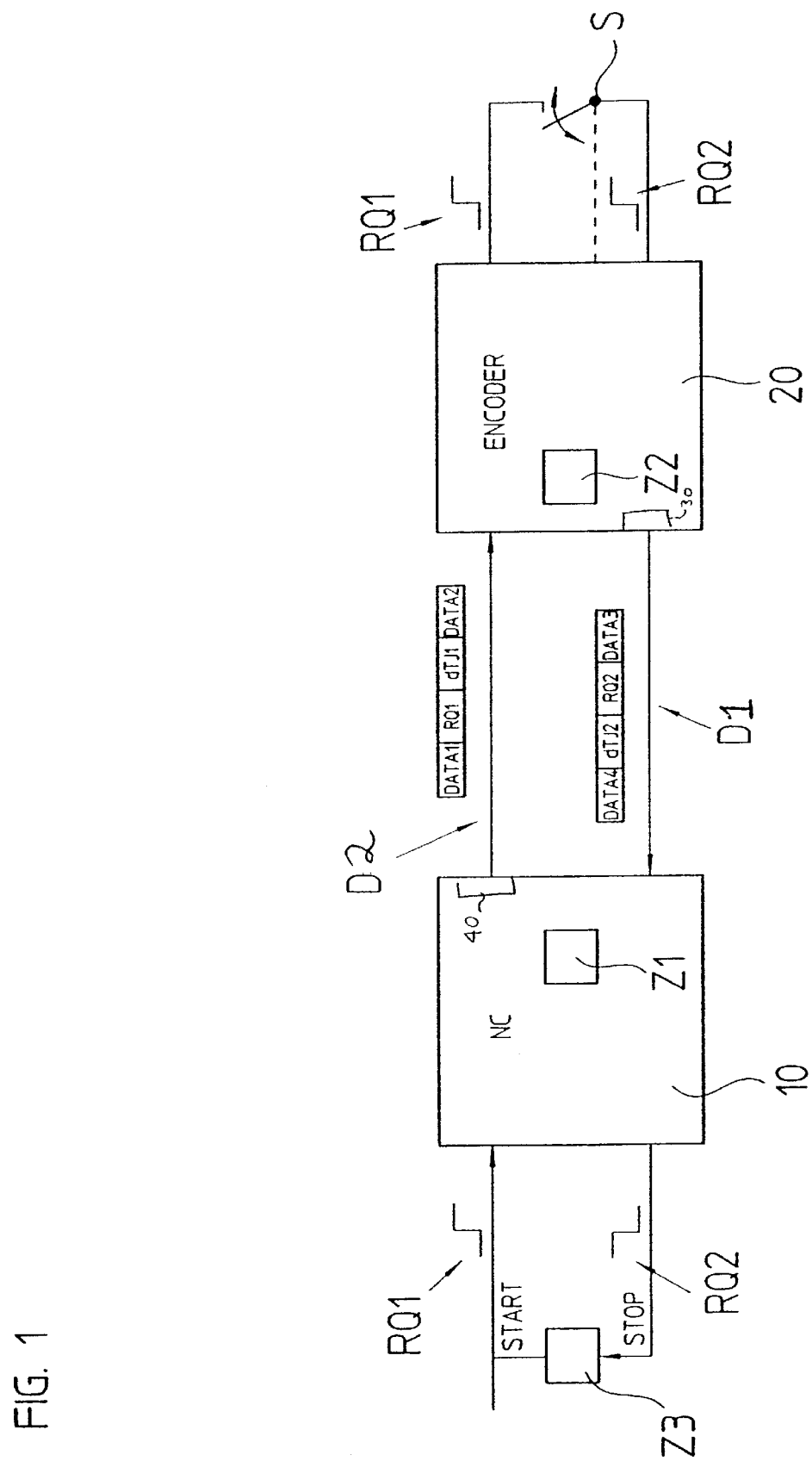
FIG. 1 is a schematized block diagram of an embodiment of a system composed of a position measuring system, a signal transmission path and a processing unit in accordance with the present invention.

A schematized block diagram is represented in FIG. 1, which illustrates the basic configuration of the system composed of a position measuring system 20 (ENCODER) and a processing unit 10 (NC) communicating with it via a digital interface. The position data, for example incremental or absolute position data generated by the position measuring system 20, are transmitted via a transmitter, such as the digital interface 30, in a continuous data stream through a data channel D1 in the form of binary data words DATA3, DATA4 to the processing unit 10 for further processing. As can be seen in FIG. 1, in the present case a transmission of data in the form of binary data words DATA1, DATA2 via a transmitter, such as the digital interface 40, in a continuous data stream in a second data channel D2 is moreover possible from the processing unit 10 to the position measuring system 20. These can be, for example, parameterization data, command data, etc.

For example, in actual use the position measuring system 20 is arranged in a machine tool and is used there for the determination of the position of movable machine elements, for example a tool. A numerical machine tool control functions as the processing unit.

In the present example, the respective data are exchanged between the position measuring system 20 and the processing unit 10 in a continuous data stream in the form of digital data words of a word length of 10 bits. It is of course also possible within the scope of the present invention to provide other word lengths.

A first counter Z1 is assigned to the processing unit 10, a second counter Z2 to the position measuring system 20, whose function will be explained in detail in the course of the further description. Moreover, a timer, such as counter Z3, is arranged on the part of the processing unit 10, which is essentially used for ascertaining the time length $\Delta t_{RQ}$ between the transmission and reception of running time measuring signals RQ1, RQ2 and which counts up in defined time intervals $\Delta t_{Z3}$. The counting frequency $f_{Z3}$ of the third counter Z3 is preferably selected to be equal to the system clock frequency of the processing unit 10, i.e. approximately $f_{Z3}$=50 MHz. In that case the time interval $\Delta t_{Z3}$=20 ns corresponds to one counting step.

Alternatively to this it would be possible in this example to select double the system clock frequency as the counting frequency $f_{Z3}$, i.e. $f_{Z3}$=100 MHz. With this it would then be possible to achieve a further increased accuracy of the desired running time determination, should this be necessary.

Figure 2:
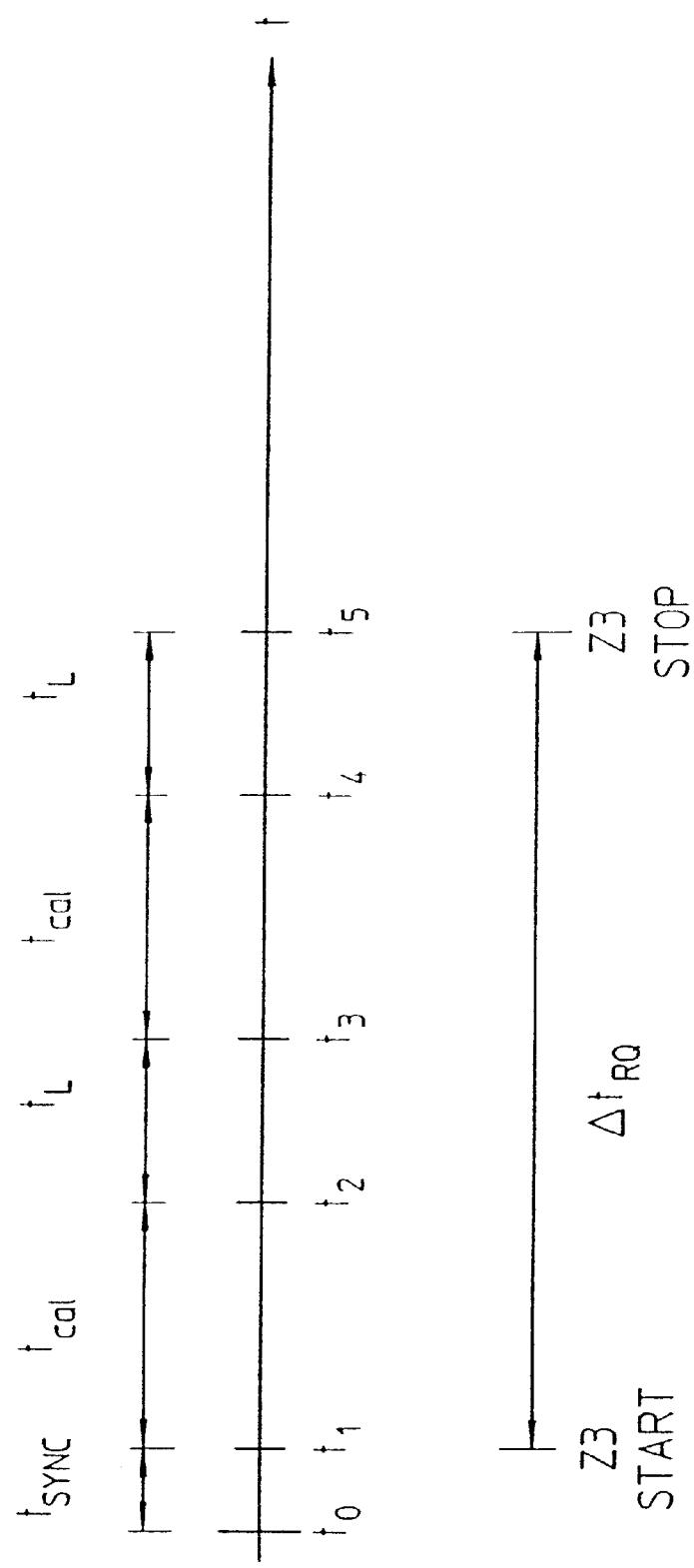
FIG. 2 represents a respective time scale for explaining an embodiment of a method in accordance with the present invention, or an embodiment of a device in accordance with the present invention, in the case of a finite cable length, or signal transmission path.

The basic steps in accordance with the present invention, or the device in accordance with the present invention for determining the signal running time $t_L$ between the position measuring system 20 and the processing unit 10 will now be explained by FIG. 1 and FIG. 2. The running time determination in accordance with the present invention explained in what follows is preferably performed prior to the actual measuring operation.

The running time determination in accordance with the present invention is started at the processing unit 10 at the time to by an incoming running time measuring signal RQ1. As indicated in FIG. 1, the running time measuring signal RQ1 is perhaps a rising signal flank. The incoming running time measuring signal RQ1 is used as the starting signal for the already mentioned third counter Z3, by which the actual running time measurement is performed. Therefore, as soon as the incoming signal flank of the running time measuring signal RQ1 is synchronized, after a synchronization time $t_{sync}$, with the counting frequency $f_{Z3}$ of the third counter Z3 at the time $t_1$, the counter Z3 starts to count up in defined counting steps.

The running time measuring signal RQ1 arrives at the processing unit 10 during the currently running transmission of a binary data word DATA1 from the processing unit 10 to the position measuring system 20. Basically it is not established here a priori at which exact time during the transmission of the 10 bit data word DATA1 the running time measuring signal RQ1 arrives. Therefore, analogous to the process in the already mentioned German Patent Application 100 30 357.9, a position signal dTJ1 is ascertained with the aid of a position signal generator, such as the counter Z1, which describes the chronological position of the running time measuring signal RQ1 with respect to the just transmitted data word DATA1. The time difference $\Delta t_{J1}$ between the start of the transmission of the data word DATA1 and the arrival of the running time measuring signal RQ1 is preferably determined as a respective first position signal dTJ1. In the example, this takes place by means of the first counter Z1 in that, starting with the transmission of the data word DATA1, it counts up from a defined starting counting value until the running time measuring signal RQ1 is present, and from this determines in a known manner a first position signal dTJ1 in the form of the ascertained time difference $\Delta t_{J1}$.

When the transmission of the data word DATA1 is finished, the appropriately processed running time measuring signal RQ1, as well as the ascertained position signal dTJ1, are subsequently transmitted at the time $t_2$ to the position measuring system 20 as binary data words, or respectively 10 bit data words. The time difference $t_{cal}$ between the times $t_1$ and $t_2$ is substantially based on the required processing time for the above explained data processing and signal editing in the processing unit 10; therefore, in this connection this will be called the processing time $t_{cal}$ in what follows. Customarily the processing time $t_{cal}$ for a defined configuration is known, and in the typical example, $t_{cal}$ approximately equals 1.7 µs.

The transmission of the two binary data words RQ1, dTJ1 to the position measuring system 20 is ended at the time $t_3$, i.e. the time interval between the time $t_2$ and $t_3$ in the end represents the simple signal running time $t_L$ to be ascertained, which is a function of the transmission path. For having the signal running time $t_L$ available to the processing unit 10, or to ascertain it, it is now additionally required to transmit the running time measuring signal RQ1 from the position measuring system 20 back again to the processing unit 10 in order to then determine the signal running time $t_L$ by the counter Z3 of a microprocessor 30. For this reason a schematically indicated switch S can be seen in the position measuring system 20, by which it is intended to indicate symbolically that in accordance with the present invention looping of the incoming first running time measuring signal RQ1 and re-transmission of a second running time signal RQ2 to the processing unit 10 takes place. In case of the desired running time measurement, it is necessary to this end to close the switch S in the position measuring system 20 by an appropriate command from the processing unit 10.

Based on the steps listed in German Patent Application 100 30 357.9, i.e. ascertaining and transmitting the position signal dTJ1, the running time measuring signal RQ1 arriving in the position measuring system 20 is present in the position measuring system 20 in a chronologically determined form, i.e. without an otherwise resulting chronological uncertainty Δt, which is caused by the finite transmission length of the 10 bitdata word DATA1. In accordance with the present invention, a second position signal dTJ2 is ascertained by the position measuring system 20 in a manner analogous to the previously explained method of the processing unit 10, which describes the relative chronological position of the incoming running time measuring signal RQ1 in reference to the data word DATA3, which had just been transmitted in the direction of the processing unit 10. Ascertaining the second position signal dTJ2 takes place here analogously to the first case of the processing unit 10, i.e. the time difference $\Delta tJ_2$ between the start of the transmission of the data word DATA3 and the arrival of the running time measuring signals RQ1 is detected as the second position signal dTJ2 with the aid of a position signal generator, such as the second counter Z2. When the transmission of the data word DATA3 is finished, the second position signal dTJ2, as well as a second running time measuring signal RQ2, are then transmitted at the time $t_4$ to the processing unit 10 as binary data words.

In the same way and analogous to the already explained signal processing by the processing unit 10, signal processing in the position measuring system 20 requires a defined processing time $t_{cal}$ between the times $t_3$ and $t_4$, as just explained, which is customarily known and in the present example lies in the same order of magnitude as already mentioned above, i.e. $t_{cal}=1.7$ µs.

The second running time measuring signal RQ2 is then provided by the processing unit 10 to the third counter Z3 as STOP signal. From the chronological difference between the START and STOP signals determined in this manner, the length of time $\Delta_{RQ}$ between the transmission of the first running time measuring signal RQ1 and the receipt of the second running time measuring signal RQ2 can be ascertained, from which the signal running time $t_L$ is to be determined in turn. This processing of the various data is preferably performed by a microprocessor of the processing unit 10.

In the described example, the simple signal running time $t_L$ for the transmission of data from the processing unit 10 and the position measuring system is derived from the following equation:

$$t_L=(\Delta t_{RQ}-(2*t_{cal})/2 \qquad \text{Equ. (1)}$$

wherein:

$t_{cal}$=signal processing time in the processing unit and the position measuring system.

In this case the value $t_{cal}$ is known for a defined configuration or, if required, can be empirically ascertained.

While the cited Equation (1) applies to identical signal processing times $t_{cal}$ in the position measuring system 20 and the processing unit 10, in principle it would also be conceivable that different signal processing times $t_{cal}$, $t'_{cal}$ exist in the processing unit 10 and the position measuring system 20. In that case the equation for determining the signal running time $t_L$ would have to be changed, for example, to:

$$t_L=(\Delta t_{RQ}-t_{cal}-t'_{cal})/2 \qquad \text{Equ (1')}$$

The determination of the signal running times between further position measuring systems and the processing unit can analogously take place by a determination of the signal running time $t_L$ for the transmission path between a position measuring system 20 and a processing unit 10 performed in this way, wherein the signal running times ascertained in this way can be used in the measuring operation for compensating possibly differences in signal running times.

Of course, further execution variations and devices do exist within the scope of the present invention besides the explained examples.

We claim:

1. A method for determining a signal running time between a position measuring system and a processing unit, which are connected with each other, the method comprising:

transmitting data words of defined length between a position measuring system and a processing unit;

transmitting a first data word from said processing unit to said position measuring system;

transmitting a first incoming running time measuring signal from said processing unit to said position measuring system during said transmitting said first data word;

determining a first position signal regarding a relative chronological position of said first running time measuring signal in relation to said first data word;

following an end of transmission of said first data word, transmitting said first running time measuring signal and said first position signal as binary data words to said position measuring system;

transmitting a second data word from said position measuring system to said processing unit;

determining a second position signal regarding a chronological relative position of said first running time measuring signal with respect to said second data word;

following an end of transmission of said second data word, transmitting said second running time measuring signal and said second position signal as binary data words to said processing unit;

ascertaining a length of time between said transmitting of said first running time measuring signal and receipt of said second running time measuring signal by said processing unit; and determining a signal running time for transmission of data between said position measuring system and said processing unit from said ascertained length of time.

2. The method in accordance with claim 1, wherein said first position signal comprises a time difference between a time of beginning transmission of said first data word and a time of arrival of said first running time measuring signal.

3. The method in accordance with claim 1, wherein said second position signal comprises a time difference between a time of beginning transmission of said second data word and a time of arrival of said second running time measuring signal.

4. The method in accordance with claim 2, wherein said second position signal comprises a time difference between a time of beginning transmission of said second data word and a time of arrival of said second running time measuring signal.

5. The method in accordance with claim 2, wherein said time difference is determined with the aid of a counter, which is set back to a defined initial counting value at a start of transmission of said first data word.

6. The method in accordance with claim 3, wherein said time difference is determined with the aid of a counter, which is set back to a defined initial counting value at a start of transmission of said second data word.

7. The method in accordance with claim 1, wherein said ascertaining said length of time is determined by a counter.

8. The method in accordance with claim 7, wherein said counter has a counting frequency which corresponds to a system clock frequency of said processing unit.

9. The method in accordance with claim 1, wherein said signal running time for transmission of data between said processing unit and said position measuring system is determined by the following equation:

$$t_L = (\Delta t_{RQ} - (2 \cdot t_{cal}))/2,$$

wherein $t_{cal}$=a common signal processing time in said processing unit and said position measuring system.

10. The method in accordance with claim 1, wherein said signal running time for transmission of data between said processing unit and said position measuring system is determined by the following equation:

$$t_L = (\Delta t_{RQ} - t_{cal} - t'_{cal})/2,$$

wherein $t_{cal}$=signal processing time in said processing unit and $t'_{cal}$=signal processing time in said position measuring system.

11. The method in accordance with claim 1, further comprising:
    determining a second signal running time between said processing unit and a second position measuring system that is connected to said processing unit.

12. The method in accordance with claim 11, further comprising:
    compensating measuring operations performed by said position measuring system and said second position measuring system based on said signal running time and said second signal running time.

13. A device for determining a signal running time between a position measuring system and a processing unit, which are connected with each other, the device comprising:
    a first position signal generator that generates a first position signal regarding a relative chronological position of a first running time measuring signal with respect to a first data word, which are both transmitted from a processing unit to a position measuring system;
    a first transmitter that transmits said first running time measuring signal and said first position signal, each as a binary data word, to said position measuring system at the end of transmission of said first data word to said position measuring system;
    a second position signal generator that generates a second position signal regarding a relative chronological position of said first running time measuring signal with respect to a second data word, which is transmitted from said position measuring system to said processing unit to a position measuring system;
    a second transmitter that transmits a second running time measuring signal and said second position signal, each as a binary data word, to said processing unit after the end of transmission of said second data word;
    a timer that ascertains a length of time between transmission of said first running time measuring signal and reception of said second running time measuring signal by said processing unit; and
    a signal running time generator that determines a signal running time from said length of time.

14. The device in accordance with claim 13, wherein said first position signal generator comprises a counter that determines a time difference between a start of transmission of said first data word and a time of arrival of said first running time measuring signal as said first position signal.

15. The device in accordance with claim 13, wherein said second position signal generator comprises a counter that determines a time difference between a start of transmission of said second data word and a time of arrival of said second running time measuring signal as said second position signal.

16. The device in accordance with claim 14, wherein said second position signal generator comprises a second counter that determines a time difference between a start of transmission of said second data word and a time of arrival of said second running time measuring signal as said second position signal.

17. The device in accordance with claim 13, wherein said timer comprises a counter arranged at said processing unit.

18. The device in accordance with claim 17, wherein said counter has a counting frequency corresponding to a system clock frequency of said processing unit.

* * * * *

UNITED STATES PATENT AND TRADEMARK OFFICE
CERTIFICATE OF CORRECTION

PATENT NO. : 6,704,685 B2
DATED : March 9, 2004
INVENTOR(S) : Erwin Bratzdrum et al.

It is certified that error appears in the above-identified patent and that said Letters Patent is hereby corrected as shown below:

<u>Title page,</u>
Item [73], Assignee, delete "Heindenheim" and substitute -- Heidenhain -- in its place.

Signed and Sealed this

Fifteenth Day of February, 2005

JON W. DUDAS
*Director of the United States Patent and Trademark Office*